United States Patent [19]

Haake et al.

[11] 4,206,581

[45] Jun. 10, 1980

[54] CORN HARVESTER

[75] Inventors: Hinrich Haake, Ahrensburg; Michael Stampfer; Hubert Meier, both of Gottmadingen; Reimar Franke, Dillingen; Hans-Jürgen Dalmer, Lauingen; Ernst Ott, Wittislingen; Josef Kienle, Lauingen, all of Fed. Rep. of Germany

[73] Assignee: Klückner-Humboldt-Deutz AG (Zweigniederlassung Fahr), Gottmadingen, Fed. Rep. of Germany

[21] Appl. No.: 955,150

[22] Filed: Oct. 27, 1978

[30] Foreign Application Priority Data

Apr. 20, 1978 [DE] Fed. Rep. of Germany ....... 2817174

[51] Int. Cl.² ............................................ A01D 45/02
[52] U.S. Cl. ..................................................... 56/14.6
[58] Field of Search ........................... 56/14.1–14.6, 56/60, 64, 122–125

[56] References Cited

U.S. PATENT DOCUMENTS

| | | | |
|---|---|---|---|
| 667,193 | 2/1901 | Crosby | 56/64 |
| 761,441 | 5/1904 | Brooks | 56/60 |
| 3,703,802 | 11/1972 | Wrestler et al. | 56/14.6 |
| 4,150,525 | 4/1979 | DeBusscher et al. | 56/14.6 |

*Primary Examiner*—Russell R. Kinsey
*Attorney, Agent, or Firm*—Karl F. Ross

[57] ABSTRACT

A corn harvester has a chassis adapted to travel along the ground and provided on its front with an intake mechanism for picking ears off the cornstalks and for reducing these ears to fragments including pieces of cob, corn kernels, and pieces of husk. These fragments are displaced backwardly onto a ridged floor having a rear edge spaced by an upstream gap from a riddle having in turn a rear edge spaced upwardly by a downstream gap from a comb. A blower directs a current of air through these gaps to separate out the chaff-like husk pieces, while the smaller and denser fragments can drop through the riddle and be collected. Both the riddle and the floor are oscillated to displace the fragments backwardly. A second comb meshes with the first comb and has a plurality of tines that are continuously displaced through the tines of the first comb to separate out husk pieces from the fragments on the first comb. Thus only the corn kernels and pieces of cob will pass through the riddle or the first comb whereas the husk pieces will be separated out.

18 Claims, 7 Drawing Figures

CORN HARVESTER

FIELD OF INVENTION

The present invention relates to a harvester. More particularly this invention concerns such a harvester which produces a so-called corn-cob mix suitable for use as silage or livestock fodder.

BACKGROUND OF THE INVENTION

In recent times the use of corn as silage in a so-called corn-cob mix has become increasingly popular. Such silage is produced by stripping the ears of corn off the cornstalk, then husking the ears, and then chopping up these husked ears into fragments formed of pieces of cob and kernels. These fragments are used directly, without drying, as a high-protein low-fiber animal food.

Normally such silage is produced by harvesting the ears of corn with a standard agricultural machine capable of separating the ears off the cornstalks, and by later running the ears through a husking and chopping machine at the barn. Thus two separate machines and two separate handling operations must be employed so that the cost of the feed is increased considerably as is the likelihood of a breakdown.

It has been suggested to chop the ears of corn directly in the field. This, however, is normally considered unsatisfactory because the husks of the ears of corn must be chopped with and left with the chopped corn cobs and kernels. The husks themselves are extremely fibrous and not normally desired in a high-quality corn-cob mix.

OBJECTS OF THE INVENTION

It is therefore an object of the instant invention to provide an improved corn-harvesting machine.

Another object is to provide such a harvester which can produce a high-quality corn-cob mix relatively free of high-fiber husks.

SUMMARY OF THE INVENTION

These objects are attained according to the instant invention in a corn harvester having a chassis adapted to travel along the ground and provided with means for picking ears off cornstalks and for reducing these ears to fragments including pieces of cob, corn kernels, and pieces of husk, and for displacing these fragments backwardly. Provided on the chassis behind this reducing means is a ridged floor extending backwardly and having a rear edge spaced by an upstream gap from a riddle which extends backwardly in turn and has its own rear edge spaced vertically by a gap from a first comb. The riddle and the floor are longitudinally reciprocated in a gyratory motion to displace the fragments backwardly so that same fall first across the upstream gap from the riddle to the screen and thence across the downstream gap from the riddle to the comb. A second comb is provided on the chassis meshable with the first comb and is arranged to be displaceable through the first comb so as to separate husk pieces from the rest of the fragments on the comb and for displacing the separated husk pieces away from the comb. The fragments, normally exclusively the smaller and denser fragments falling through the riddle and through the comb are caught underneath the riddle and the comb and recovered for use as the corn-cob mix.

Thus the machine according to the instant invention allows the husk pieces to be accurately and surely separated out from the denser fragments constituted by the corn kernels and the pieces of cob.

According to another feature of this invention a blower is provided underneath the floor and the screen which directs the kernels there horizontally backwardly through both of the gaps, so that only the denser fragments will be able to move through these gaps and fall down onto the catching floor at the base of the harvester. This blowing action separates the chaff-like husks from the denser and more desirable fragments. In addition the use of two combs has been found to be extremely efficient not only in separating the husk pieces from the rest of the fragments, but also in scraping off the husk pieces any kernels or cob pieces that may be adhering thereto. The result is a corn-cob mix almost completely free of husk pieces. At the same time these husk pieces may be recovered separately or simply dropped behind the harvester in the field for use as mulch when the field is replowed.

In accordance with the instant invention the second comb may be as described in the commonly assigned and copending application Ser. No. 955,181 filed Oct. 27, 1978 a rotary comb having a central shaft and a plurality of radially extending tines. These tines pass through the tines of the first comb which all lie in a common plane that may be tipped to vary the extent of overlap of the two combs relative to each other. The tines of the rotary comb may extend from a helix on the surface of the comb and be inclined or curved somewhat backwardly in the normal direction of rotation of this comb for best cleaning effect and smooth operation. These tines of the second comb may also be made deflectable or may be made completely of elastomeric material to prevent jamming of the machine.

According to another feature of this invention another such rotor and comb set may be provided between the ridged floor and the leading edge of the riddle, so that husk pieces will be separated out at two separate locations. Also it is possible to provide the riddle with a lateral outlet that is provided with a comb arrangement as described above for separating out the husk pieces.

According to further features of this invention an intercepting curtain is hung from the chassis between the reducing means and the screen. This curtain intercepts fragments thrown backwardly from the drum of the reducing means and ensures that they fall down onto the floor, where they will be shaken and moved backwardly with the denser fragments working themselves to the bottom of the mass of the floor and the lighter fragments moving to the top of this mass. This curtain may have a stiffening element at its lower end which may be straight or V-shaped. If V-shaped it is open forwardly and pointed backwardly to deflect backwardly thrown fragments into the center of the underlying floor screen. When the stiffening member is straight it may coact with stops on the sidewall of the chassis so that during travel of the harvester on an incline, that is with one side of the harvester higher than the other, the stiffening element will be caught on its downhill side so that it will tilt backwardly on its uphill side and automatically deflect the backwardly thrown fragments uphill, against the direction they would normally go.

The harvester according to the instant invention therefore allows a high-quality and low-fiber corn-cob mix to be produced directly in the field. The husks and stalks can be left in the field for plowing-in and only the mix usable as feed or silage need be transported away. The mix produced by the harvester is almost completely free of husk pieces and can be used directly as is.

SPECIFIC DESCRIPTION

Figure 1:
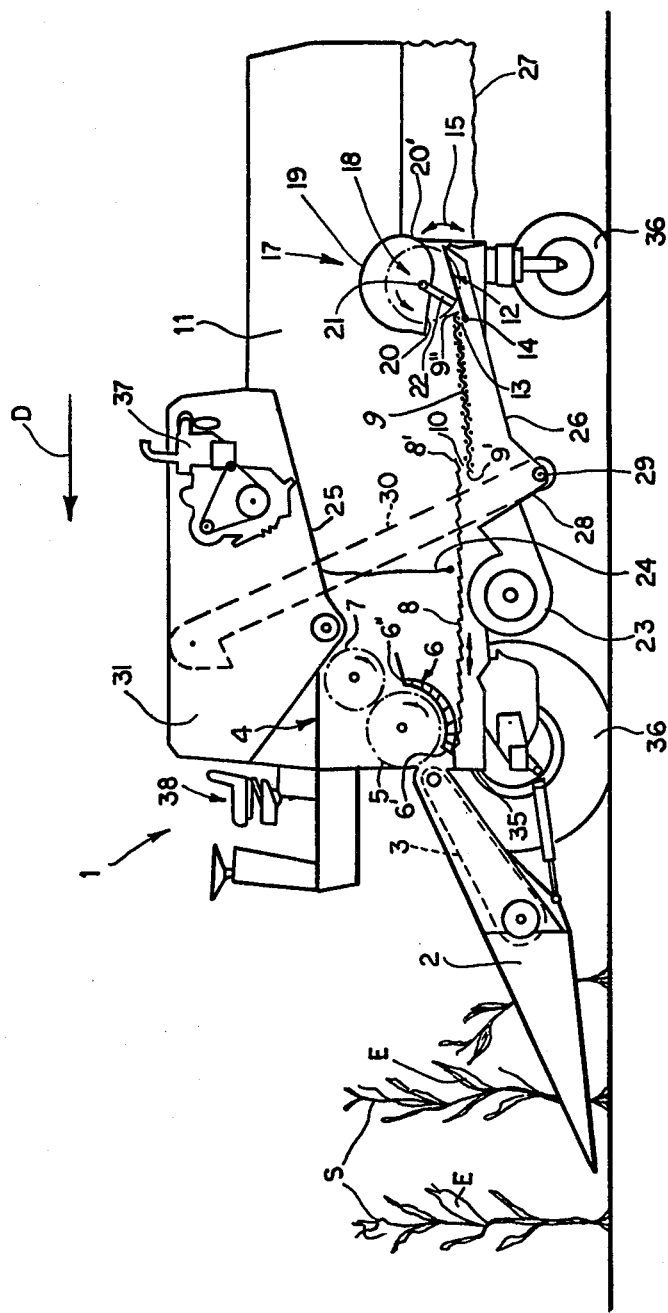
FIG. 1 is a largely schematic side view of the agricultural machine according to this invention.

As shown in FIG. 1 an agricultural machine 1 according to this invention has a chassis 35 supported by front and rear wheels 36 and adapted to travel along the gound in a direction D. An internal-combustion engine 37 is provided which operates all of the mechanism of this machine and which in turn is operated from an operator's station 38 on the top front of the machine relative to the direction D.

The machine has at its front end an intake 2 provided with a conveyor or stripper 3 adapted to separate ears E from stalks S of corn. Immediately behind this intake device 2 there is provided a threshing or chopping drum 5 rotated continuously about a horizontal axis and juxtaposed with a threshing concave or grid 6 spaced more closely to the drum 5 at its upstream end 6' than at its downstream end 6''. Slightly above and behind this drum 5 is a stripping and deflecting drum 7. The drum 5 rotates at a peripheral speed of between 12 m/sec and 24 m/sec to reduce the ears E to fragments including pieces of cob, corn kernels, and pieces of husk. The drum 7 serves to deflect these fragments down onto a horizontally and transversely ridged floor 8 and also prevents the drum 5 from merely carrying these fragments around in its orbit.

The floor 8 is adapted to be reciprocated horizontally with limited vertical movement in such a manner as to move the fragments received from the drum 5 backwardly in a direction opposite to the direction D. A curtain 24 is hung from the floor 25 of a receptacle or bin 31 and extends transversely to the direction D down to a position immediately above the ridged floor 8. Thus material thrown back through the air will strike this curtain 24 and fall down to the floor 8. As the fragments move backwardly on the floor 8 the lighter fragments will inherently rise to the surface.

The rear end 8' of the transversely ridged floor 8 is positioned behind the leading end 9' of a riddle 9, and spaced above this end 9' by a gap 10. An axial-input radial-output blower 23 is provided on the chassis underneath the floor 8 and has an output directed upwardly underneath the riddle 9 and through the gap 10. Thus as the fragments fall off the rear edge 8' and onto the riddle 9 the current of air coming through the gap 10 will project the lighter fragments, mainly pieces of husk, backwardly on the riddle 9. The smaller and denser fragments will pass through the riddle 9 and fall onto a floor 26 whence they can slide forwardly into a trough 28 provided with an auger 29 that leads to an elevator 30 that will displace these smaller and denser fragments upwardly into the receptacle 31.

The motor 37 is adapted to gyrate the riddle 9 through a horizontally elongated circular stroke that displaces the fragments thereon backwardly while agitating them so that, once again, the heavier and denser fragments will fall through and onto the floor 26.

Figure 6:
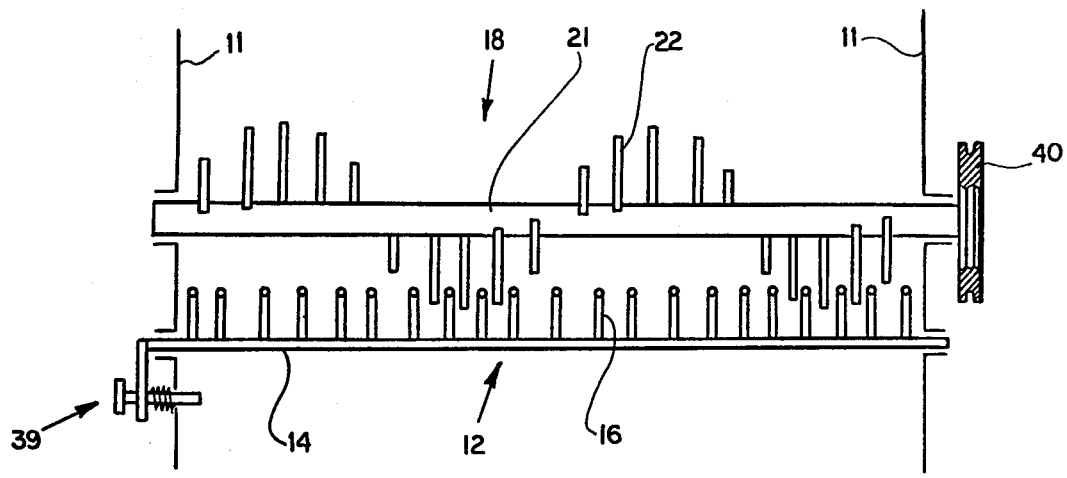
FIG. 6 is a large-scale top view of a detail of the machine of FIG. 1.
Figure 7:
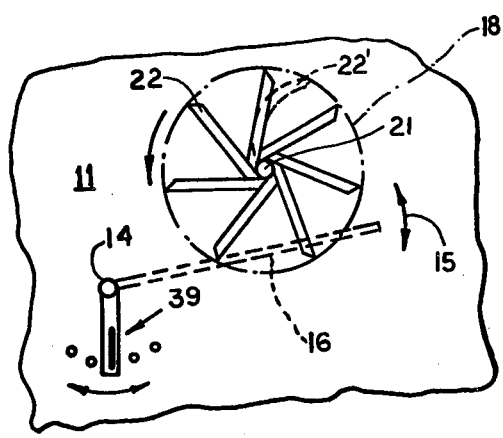
FIG. 7 is an end view of the structure shown in FIG. 6.

Located behind the rear edge 9'' of the riddle 9 is a husk-separating arrangement 17 comprising basically a comb or rake 12, a rotor 18, and a housing 19. More particularly the rake 12 as shown in more detail in FIGS. 6 and 7 comprises a plurality of identical tines 16 lying in a common plane and all extending radially from a horizontal shaft or axle 14 journaled in the side walls 11 of the chassis 35 and adjustable pivotally as shown by arrow 15 by means of a mechanism 39 so that the angular position of these tines 16 can be varied.

The rotor 18 comprises a central shaft 21 from which extend a multiplicity of identical generally radially extending tines 22 of round or rectangular section extending in substantially a helical arrangement that forms effectively a two-turn screwthread formation thereon. The shaft 21 mounts a V-belt pulley 40 which is adapted to be driven by the motor 37. The tines 22 are staggered relative to the tines 16 so that as the rotor 18 turns the tines 22 will pass between the tines 16, with the rotor 18 turning in a counterclockwise direction as seen in FIG. 1 so that its region adjacent the edge 9'' is moving away from the riddle 9. The tines 22 are inclined somewhat backwardly in the normal direction of rotation of the rotor 18, or may be curved backwardly in the direction as shown at 22 in FIG. 7.

The housing 19 is formed of a row of parallel plates 20 each lying in a respective plane between a respective pair of tines and each having a curved edge 20' which has a center of curvature generally level with but behind the shaft 21. Thus as the rotor 18 turns, any fragments picked up by the tines 22 will be stripped off the rotor and will drop back onto a horizontal wind-protection screen 27. These edges 20' are preferably sharpened to actually cut adhering pieces loose to prevent the machine from jamming up. An adjustment means similar to the mechanism 39 is provided for pivotally positioning the housing 19. By the time the fragments moving back along the riddle 9 reach the edge 9'' the mass on the riddle 9 will consist mainly of relatively light husk fragments. The vigorous agitation of the riddle 9 will cause most of the small kernels and cob pieces to separate from the husk pieces and fall through the riddle 9. Nonetheless some cob pieces and kernels will still be mixed with the husk pieces and all of the remaining kernels fall off the rear edge 9'' through a horizontally extending and forwardly open gap 13 formed between this rear edge 9'' and the rake 12.

Displacement of the husk pieces forwardly through the gap 13 and onto the floor 26 is possible as the blower 23 generates a current of air which passes backwardly through the gap 13 so that these light husk fragments will be urged backwardly by the current of air, but the heavier cob pieces and kernels will be able to move rearwardly and fall between the tines 16. The rotor 18, which operates at a peripheral speed of 15 m/sec, therefore catches these husk pieces and forces them through and back along the comb 12. This rapid action automatically separates them from any remaining kernels of cob pieces and tosses these husk pieces backwardly onto the horizontal curtain screen 27. Thereafter the husk pieces, which are normally too fibrous for use as silage, are allowed to fall onto the field where they may be plowed under as mulch. The backwardly moving current of air from the blower 23 also passes through the combs 12 and 18 to aid in this chaff separation.

Figure 3:
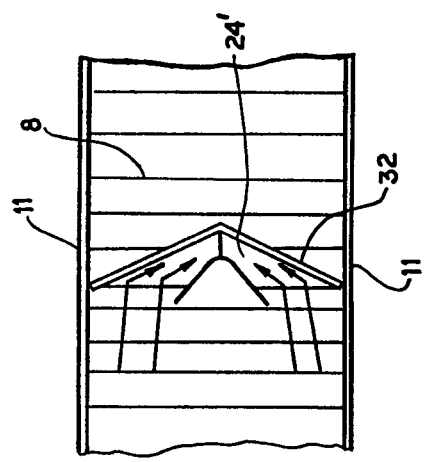
FIG. 3 is a section taken generally along line III—III of FIG. 2.
Figure 2:
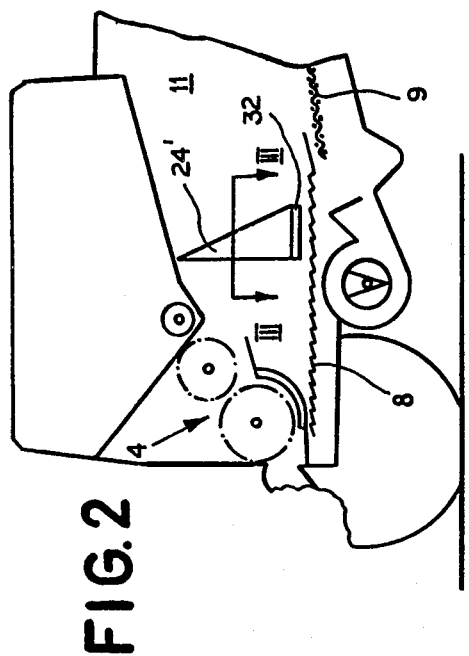
FIG. 2 is a large-scale and largely schematic view of a detail of FIG. 1.

FIGS. 2 and 3 show an arrangement wherein a curtain 24' substantially identical to the curtain 24 of FIG. 1 is provided at its lower end with a heavy metallic V-shaped stiffener 32 that points backwardly and is flared forwardly. Thus material tossed backwardly against the curtain 24' by the drums 5 and 7 will be deflected into the center of the ridged floor 8 for maximum efficiency and to prevent leakage of some of this material between the edges of the floor 8 and the sidewalls 11.

Figure 5:
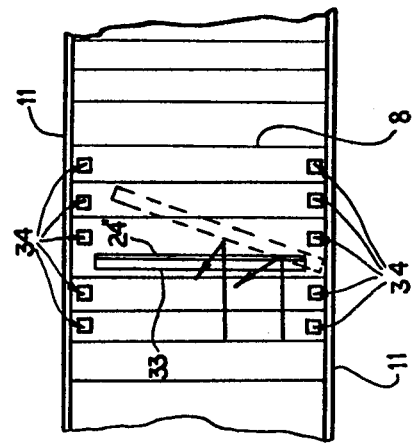
FIGS. 4 and 5 are views corresponding generally to FIGS. 2 and 3 but showing another arrangement according to this invention.
Figure 4:
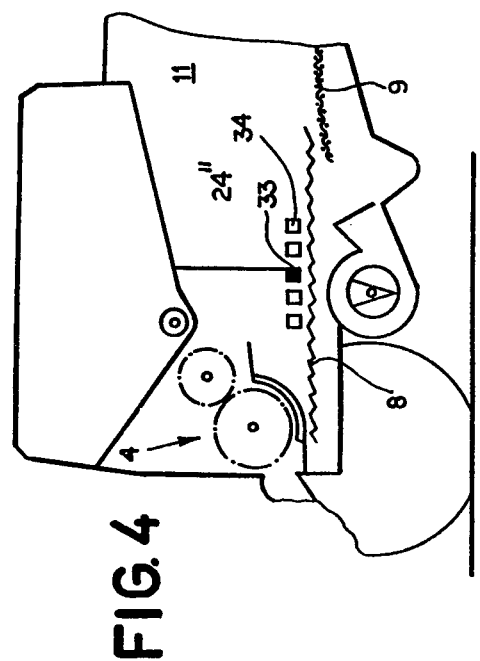

FIG. 4 shows an arrangement particularly useful when corn is being harvested on a slope. Here the curtain 24" is provided at its lower edge with a horizontally extending and straight stiffener bar 33. Each side wall 11 is provided with five horizontally spaced projections or stops 34. When harvesting on the level the bar 33 will be able to move limitedly forwardly and backwardly free of the stops 34. This is shown in solid lines in FIG. 5. When harvesting on a slope, however, the bar 33 will inherently tip towards one side wall 11 and will engage between two of the stops 34 on the downhill side as shown in dashed lines in FIG. 5. The force of the material striking the curtain 24" will inherently push the bar 33 and curtain 24" backwardly, but since the one side is held this will only move the other side back. Therefore a tendency of the crop to collect in one side of the floor 8 during hill harvesting is automatically countered by opposite tipping of the curtain 24" and opposite deflection of the fragments uphill.

We claim:

1. A corn harvester comprising:
   a chassis adapted to travel along the ground;
   means on the front of said chassis for picking ears off cornstalks;
   means on said chassis for reducing said ears to fragments including pieces of cob, corn kernels, and pieces of husk, and for displacing said fragments backwardly;
   a riddle on said chassis positioned to receive said fragments at least indirectly from the reducing means and having a rear edge;
   a first comb on said chassis spaced by a gap below said rear edge of said riddle;
   means for displacing said riddle and for moving said fragments backwardly with a portion of the smaller and denser fragments falling through said riddle and the rest of said fragments falling across said gap onto said first comb;
   a second comb on said chassis meshable with said first comb;
   means for displacing said second comb through said first comb and thereby separating said husk pieces from the rest of said fragments on said comb and for displacing the separated husk pieces away from said comb; and
   means underneath said riddle and said comb for catching the fragments passing through same.

2. The harvester defined in claim 1, further comprising:
   a ridged floor between said reducing means and said comb and having a rear floor edge spaced vertically of a forward position of said riddle;
   means for horizontally reciprocating said floor and thereby backwardly displacing fragments on said floor so that said fragments fall across said upstream gap onto said riddle; and
   blower means for directing a current of air backwardly through at least said upstream gap thereby displacing the lighter fragments including mainly said husk pieces backwardly.

3. The harvester defined in claim 1, further comprising a curtain suspended from said chassis between said reducing means and said screen and positioned to intercept the fragments displaced backwardly by said reducing means.

4. The harvester defined in claim 3 wherein said curtain is provided with a forwardly open and backwardly pointed V-shaped stiffening element at its lower edge.

5. The harvester defined in claim 3 wherein said curtain has a lower edge provided with a generally straight stiffening element extending generally perpendicular to the normal direction of travel of said chassis, said chassis carrying a plurality of stops engageable with the ends of said stiffening element when said chassis is tipped, said stops being provided to both lateral sides of said stiffening element and being spaced apart by a transverse distance slightly greater than the transverse length of said stiffening element, whereby when said chassis is level said element can swing forwardly and backwardly between and out of contact with said stops.

6. The harvester defined in claim 1 wherein said second comb has a central rotatable and axis-defining second shaft extending generally horizontally and generally perpendicular to the normal direction of travel of said chassis and a plurality of generally radially extending second tines projecting from said shaft.

7. The harvester defined in claim 6 wherein said tines are angularly elastically deflectable on said shaft.

8. The harvester defined in claim 7 wherein said tines are of elastomeric material.

9. The harvester defined in claim 6 wherein said tines have radial inner ends secured to said shaft along a helix thereon, said tines extending screwthread-fashion from said shaft.

10. The harvester defined in claim 9 wherein said helix has two full turns around said shaft.

11. The harvester defined in claim 6 wherein said first comb includes a first shaft and a generally planar array of first tines projecting transversely from said first shaft.

12. The harvester defined in claim 11 wherein said first tines and second tines interleave on rotation of said second comb about the axis of said second shaft.

13. The harvester defined in claim 11, further comprising means for pivoting said first comb about the axis of said first shaft and for securing said first comb in any of a plurality of angular offset positions, whereby the extent to which the orbit of said second comb extends through said first comb can be adjusted.

14. The harvester defined in claim 6 wherein said second tines are inclined backwardly in the normal direction of rotation of said second comb.

15. The harvester defined in claim 6 wherein said second comb is rotated at a peripheral speed of at least 10 m/sec.

16. The harvester defined in claim 1, further comprising a curtain behind said combs and positioned to intercept said separated husk pieces from said second comb.

17. The harvester defined in claim 1 wherein said reducing means includes a rotatable reducing drum and spacedly juxtaposed therewith a grate.

18. The harvester defined in claim 17, further comprising means for rotating said drum relative to said grate, said grate having relative to the normal direction of rotation of said drum a leading edge and a trailing edge, the latter being spaced further from said drum than the former.

* * * * *